April 21, 1925. 1,535,023
C. H. KELLEY
SECTIONAL MOLD FOR CONCRETE STRUCTURES
Filed April 19, 1923
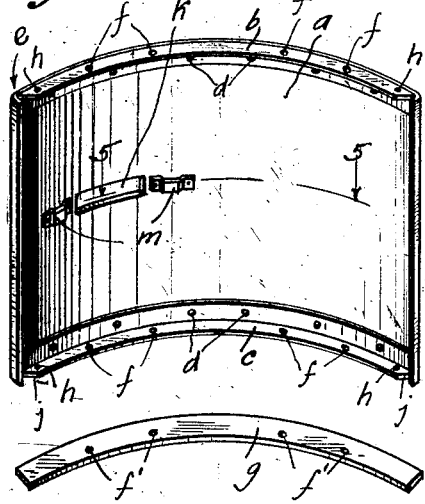
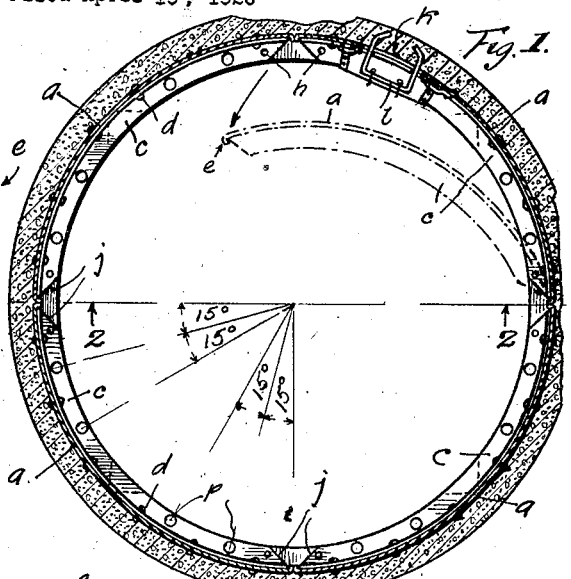
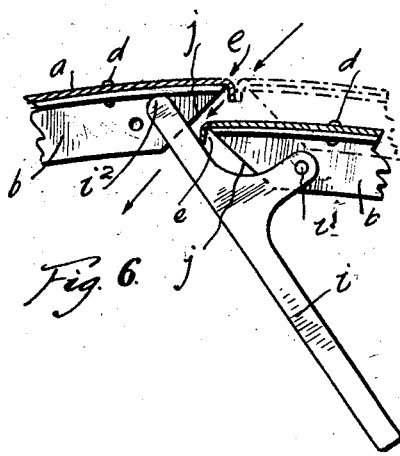
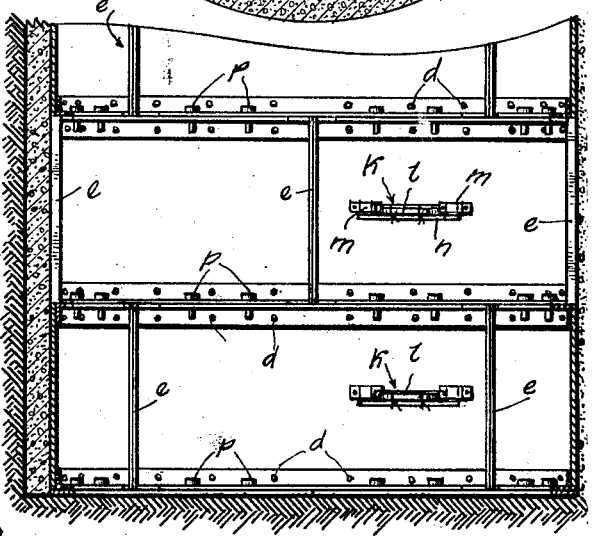
Inventor:
Carleton H Kelley Patented Apr. 21, 1925.

1,535,023

UNITED STATES PATENT OFFICE.

CARLETON H. KELLEY, OF KALISPELL, MONTANA.

SECTIONAL MOLD FOR CONCRETE STRUCTURES.

Application filed April 19, 1923. Serial No. 633,174.

*To all whom it may concern:*

Be it known that I, CARLETON H. KELLEY, a citizen of the United States, and a resident of Kalispell, county of Flathead, and State of Montana, have invented a new and useful Improvement in Sectional Molds for Concrete Structures, of which the following is a specification.

My invention is an improvement in concrete mold for use in making concrete walls, and one of the principal objects of my invention is to provide a form made in sections which are reversible and interchangeable and which, when placed side by side, and one upon the other, form a continuous mold, of any desired height.

A further important object is to provide durable and strong mold members which not only are interchangeable, but which will form concrete structure which does not have impressed thereon the lines of demarcation between the separate units.

A further object is to provide mold sections which are easily and cheaply built, and which may be easily and quickly assembled and subsequently knocked down, and in the building of which unskilled labor may be used.

A further object is to provide a circular or elliptical form in which the interior mold can be assembled and subsequently knocked down without the use of expanding sections or other similar devices.

I attain my object in a mold of the character described in which a plurality of curved mold-sections adapted for being arranged in a horizontal course, are each provided with a stiffening flange, the opposite ends of which are cut away at such an angle that, when the mold-sections are set up, one of the sections may be independently removed.

The construction and modes of using my invention are illustrated in the accompanying drawings, in which:

Fig. 1 is a cross section thru a concrete structure with an interior mold, embodying my invention, in place;

Fig. 2 is a longitudinal section taken on the line 2—2 of Fig. 1 and shows a fragmentary view of an assembled circular form;

Fig. 3 is a perspective view of one section of my improved form;

Fig. 4 is a perspective view of a circular segment of bar iron which holds the top and bottom courses together on one edge;

Fig. 5 is an enlarged sectional view taken thru one section of my improved form, which is taken substantially on the line 5—5 of Fig. 3;

Fig. 6 is a fragmentary view illustrating how one of the mold sections may be removed from said assembled form; and Fig. 7 is a diagrammatic view of the jointure between two sections and shown in dotted lines how one end may be moved by the other.

My improved sectional concrete mold is made of a number of sections which are interchangeable and reversible and are substantially identical, except in so far as their surfaces are changed to provide variations in the surface of the structure being formed. Each section is made of a metallic plate $a$ which is stiffened by angular members $b$ and $c$ on each end, which are held to the metallic plate $a$ by rivets $d$. The side portions of the plate are turned, as at $e$, so as to stiffen the structure vertically as well as to provide an abutment for the adjacent sections in the same course. I provide holes $f$ in the stiffener angles $b$ and $c$ which are so spaced that they will aline themselves with the holes in the adjacent upper and lower courses. Tie-bolts $p$ are placed in these holes and hold the sections together. In a circular form, as shown in the accompanying drawings, which is made with four sections, I space the holes 15° and 30° from each end, leaving a portion of 30° in the center of the stiffener angles blank. This is arranged in this manner so that the alternate courses in the assembled mold can be placed with their jointures alined and the intermediate sections can also have their jointures alined and thus the mold is not made with a continuous joint thru the longitudinal dimension. This arrangement gives rigidity in the mold structure and also prevents the courses from spreading apart at their jointures, and thus throwing the mold out of alinement and varying the size of the concrete structure being formed. If the plates embodying my invention are used in a flat structure the spacing of the holes is approximately one-sixth and one-third of the distance from each end, the middle third being blank. I provide sectors of flat bar iron $g$ which are placed on the uppermost and lowermost edges of my assembled form and thus keep the end courses from spreading as they normally would if unconnected. These flat bars $g$ have holes $f'$ which match up with the holes $f$ in the adjacent angles as do the holes $f$ in the adjacent sections. I provide holes $h$ at the ends of the stiffener angles which do not match up with the holes on the adjacent courses and serve as grip holes in which a wrench $i$ can be placed so as to knock down my assembled form. As is well known, metallic forms similar to the ones embodying my invention, and shown in the accompanying drawings, have a tendency to adhere to the concrete walls even tho precautions are taken to prevent the concrete setting to the mold. It is necessary to use a considerable amount of force to pry one of these sections loose. I place the prong $i'$ in the hole $h$ and place the shoulder $i^2$ against the end of the adjacent stiffener angle and thus leverage may be applied to one corner of the section which may be pried loose and the form can then be removed merely by overcoming the adhesion of the remaining part of the section. The section may then be swung inwardly as shown in dotted lines in Fig. 1 in the accompanying drawings. The corners of the angle sections are beveled, as at $j$, so that the sections can be drawn directly inwardly without interference with adjacent sections in the courses. The vertical flanges $e$ are resilient and thus permit the abutting flange to spring by as is illustrated in Fig. 7. This permits the course to be assembled and knocked down without the use of a key section. The flange $e$ is of negligible width as compared with the diameter of the structure and thus does not prevent the form from being pulled inwardly.

I provide an aperture $k$ in some of the units thru which step irons $l$ may be placed and held in position so as to be imbedded in the concrete form. I provide two eyes $m$ in which the legs of a bracket $n$ may be placed. The flat portion of the bracket provides a ledge on which the step iron $l$ can be tied while the concrete form is hardening. The bracket $n$ has a portion $o$ which covers the aperture $k$ closely about the step irons $l$.

I claim:

1. In a mold of the character described, an end ring made in sections and provided with holes for receiving tie-bolts, a plurality of interchangeable, reversible curved mold sections adapted for being arranged in a horizontal course, each provided with a stiffening flange, the opposite ends of which are cut away at such an angle that, when the mold-sections are set up, one of the sections may be independently removed, said stiffening element being provided with holes for receiving tie-bolts, the ends of said sections being respectively provided with perpendicular resilient ribs adapted to permit said removal.

2. In an internal mold, curvilinear in cross section made in courses composed of a plurality of sections each provided with inturned flanges about their perimeter, the ends of the flanges on the edges of said sections transverse to the central axis of said mold being cut away at a substantial angle to a line drawn radial to said axis and the flanges parallel to said axis being relatively yielding and resilient, whereby each section may be removed without disturbing the remaining sections of the courses.

3. In an internal mold, curvilinear in cross section made in courses composed of a plurality of sections each provided with inturned flanges about their perimeter, the ends of the flanges on the edges of said sections transverse to the central axis of said mold and being cut away, and the flanges parallel to said axis being relatively yielding and resilient, whereby each section may be removed without disturbing the remaining sections of the courses, certain of said sections being provided with means for receiving and holding auxiliary devices to be embedded in the material being moulded.

4. In an internal mold, curvilinear in cross section made in courses composed of a plurality of sections each provided with inturned flanges about their perimeter, the ends of the flanges on the edges of said sections transverse to the central axis of said mold being cut away and the flanges parallel to said axis being relatively yielding and resilient, whereby each section may be removed without disturbing the remaining sections of the courses, the ends of the transverse flanges being provided with engaging means for a tool to aid said withdrawal of the separate sections.

CARLETON H. KELLEY.